US008566147B2

(12) United States Patent (10) Patent No.: US 8,566,147 B2
Dawkes et al. (45) Date of Patent: Oct. 22, 2013

(54) DETERMINING THE PROGRESS OF ADOPTION AND ALIGNMENT OF INFORMATION TECHNOLOGY CAPABILITIES AND ON-DEMAND CAPABILITIES BY AN ORGANIZATION

(75) Inventors: Martyn James Dawkes, Caterham (GB); Christopher James Holloway, Woking (GB)

(73) Assignee: International Business Machines Corporation, Armonk, NY (US)

( * ) Notice: Subject to any disclaimer, the term of this patent is extended or adjusted under 35 U.S.C. 154(b) by 1902 days.

(21) Appl. No.: 11/257,824

(22) Filed: Oct. 25, 2005

(65) Prior Publication Data

US 2007/0094059 A1 Apr. 26, 2007

(51) Int. Cl.
*G06Q 10/00* (2012.01)
(52) U.S. Cl.
USPC ........ 705/7.39; 705/7.15; 705/7.36; 705/7.38
(58) Field of Classification Search
USPC .............................. 705/7.15, 7.36, 7.38, 7.39
See application file for complete search history.

(56) References Cited

U.S. PATENT DOCUMENTS

| | | | | |
|---|---|---|---|---|
| 6,327,571 B1* | 12/2001 | Khayat et al. | ................... | 705/10 |
| 6,691,127 B1* | 2/2004 | Bauer et al. | ................... | 707/702 |
| 6,915,270 B1* | 7/2005 | Young et al. | ................... | 705/10 |
| 6,968,312 B1* | 11/2005 | Jordan et al. | ....................... | 705/7 |
| 7,025,809 B2* | 4/2006 | Chen et al. | ....................... | 95/224 |
| 7,120,643 B2* | 10/2006 | Dill | ....................... | 1/1 |
| 7,155,423 B1* | 12/2006 | Josephson et al. | ............... | 706/60 |
| 7,290,275 B2* | 10/2007 | Baudoin et al. | ................... | 726/1 |
| 7,346,529 B2* | 3/2008 | Flores | ............... | 705/7 |
| 7,406,430 B2* | 7/2008 | Atefi et al. | ....................... | 705/7 |
| 7,761,316 B2* | 7/2010 | Ligon et al. | ....................... | 705/7 |
| 2002/0082778 A1* | 6/2002 | Barnett et al. | ................... | 702/1 |
| 2003/0110067 A1* | 6/2003 | Miller et al. | ....................... | 705/8 |
| 2004/0015377 A1* | 1/2004 | Hostetler | ....................... | 705/7 |
| 2004/0098299 A1* | 5/2004 | Ligon et al. | ....................... | 705/10 |
| 2005/0027550 A1* | 2/2005 | Pritchard et al. | ................... | 705/1 |
| 2005/0125272 A1* | 6/2005 | Hostetler | ....................... | 705/7 |
| 2005/0144592 A1* | 6/2005 | Below et al. | ................... | 717/124 |
| 2005/0198486 A1* | 9/2005 | Desmond et al. | ................... | 713/1 |

(Continued)

FOREIGN PATENT DOCUMENTS

WO WO 01/25970 * 4/2001

OTHER PUBLICATIONS

Standard CMMI Appraisal Method for Process Improvement (SCAMPI) Version 1.1—Method Definition Document SEI Joint Program Office, Carnegie Mellon University, Dec. 2001.*

(Continued)

*Primary Examiner* — Scott L Jarrett
(74) *Attorney, Agent, or Firm* — Schmeiser, Olsen & Watts, LLP; John R. Pivnichny

(57) ABSTRACT

A capability progress modeling component for determining the progress of adoption of an on-demand capabilities model by an organization, the deployment progress component comprising: a completion state descriptor component for receiving inputs from an entity describing a current state, a target state and a modeled state for the organization; and a state comparator component for comparing the current state and modeled state with the target status to derive a set of parameters, the state comparator component analyzing the set of parameters to determine deviation points indicating capability areas requiring attention in order for the organization to progress to an on-demand capabilities model.

12 Claims, 12 Drawing Sheets

(56) References Cited

U.S. PATENT DOCUMENTS

| | | | | |
|---|---|---|---|---|
| 2005/0278202 | A1* | 12/2005 | Broomhall et al. | 705/7 |
| 2006/0069540 | A1* | 3/2006 | Krutz | 703/22 |
| 2006/0074839 | A1* | 4/2006 | Pursche et al. | 707/1 |
| 2006/0095309 | A1* | 5/2006 | Mangan et al. | 705/8 |
| 2006/0224425 | A1* | 10/2006 | Homann et al. | 705/7 |
| 2007/0150293 | A1* | 6/2007 | Dagnino | 705/1 |

OTHER PUBLICATIONS

Paulk, Mark C. et al., Capability Maturity Model for Software Version 1.1 Carnegie Mellon University, Technical Report CMU/SEI-93-TR-024, Feb. 1993.*

Clarke, Angela et al., The Development of a Best Practice Model for Change Management European Management Journal, vol. 15, No. 5, 1997.*

Pederiva, Andrea, The COBIT Maturity Model in Vendor Evaluation Case Information Systems Control Journal, vol. 3, 2003.*

Systems Security Engineering Capability Maturity Model—Model & Appraisal Method Apr. 1999.*

Mathias, Ekstedt et al., An Organization Wide Approach for Assessing Strategic Business and IT Alignment PICMET 2005.*

Prosci's Change Management Maturity Model Prosci, 2004.*

Gareis, Roland, A Process-based Maturity Model for the Assessment of the Competences of Project-oriented Companies Projekt Management Austria, Second SENET Conference, 2002.*

Luftman, Jerry, Assessing Business-IT Alignment Maturity Communications of the Association for Information SYstems, vol. 4, No. 14, Dec. 2000.*

Organizational Project Management Maturity Model—OPM3 Project Management Institutue, 2003.*

Organizational Project Management Maturity Model—OPM3 Project Management Institute, 2003.*

Curtis, Bill, People Capability Maturity Model (P-CMM) Version 2.0 Carnegie Mellon Software Engineering Institute, Jul. 2001.*

Lowe, Douglas E., Implementing the Capability Maturity Model For Software Development Hewlett-Packard Journal, Article 1, Aug. 1996.*

Strategic Planning: What Works . . . and What Doesn't APQC, 1999.*

Hackos, Joann T., Using the Information Process-Maturity Model as a Tool for Strategic Planning Technical Communication, Fourth Quarter 1997.*

* cited by examiner

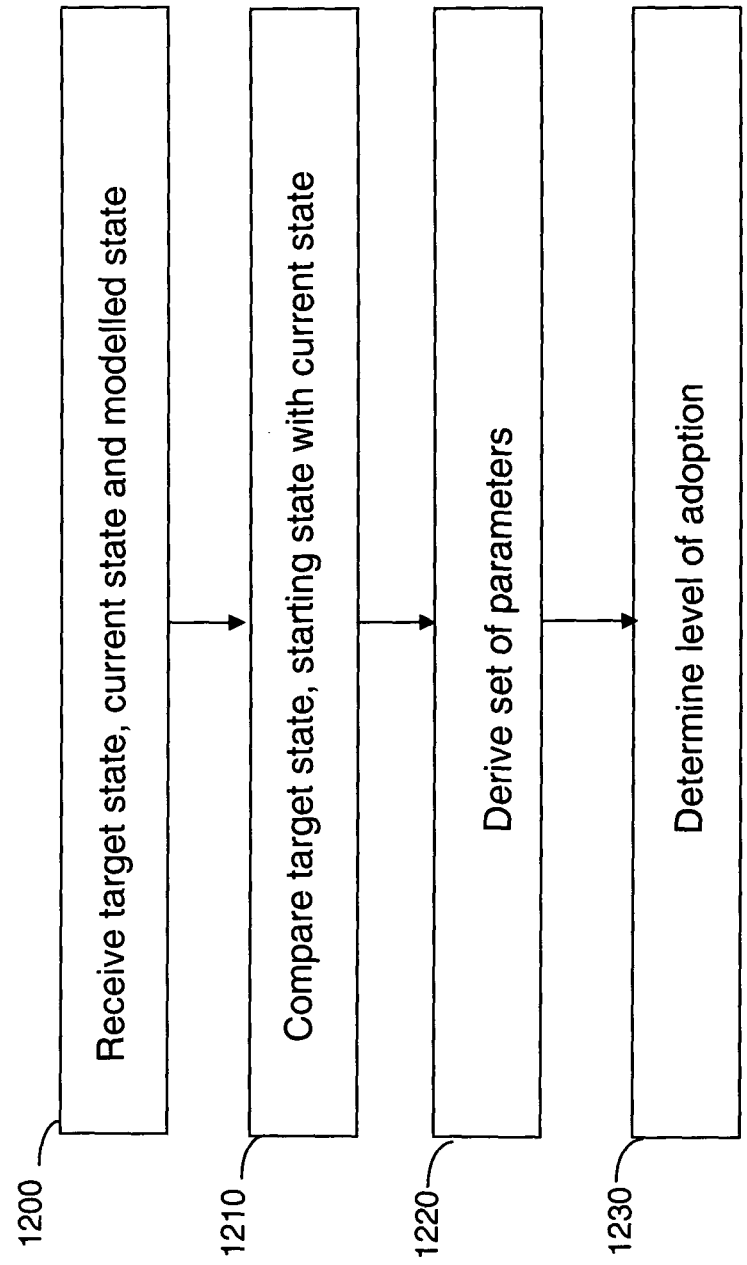

DETERMINING THE PROGRESS OF ADOPTION AND ALIGNMENT OF INFORMATION TECHNOLOGY CAPABILITIES AND ON-DEMAND CAPABILITIES BY AN ORGANIZATION

FIELD OF THE INVENTION

The invention relates to the field of architectural modelling tools. In particular, the invention relates to a method and system for determining the progress of adoption of an on-demand capability model by an organization.

BACKGROUND OF THE INVENTION

In the last few years an economic downturn has created a major focus on cost cutting and efficiency initiatives across many types of industries. One of the greatest impacts of the economic downturn, in the years 2002 to 2003, has been seen within the financial services sector which has seen an increase in governmental regulation and a demand for greater transparency in financial reporting, accounting and risk management.

In response to cost cutting Chief Information Officers have sought to simplify and consolidate their financial services infrastructure. This has been achieved by replacing current information technology (IT) infrastructure with new products and services and/or finding opportunities for out-sourcing and off-shoring their service and infrastructure support. While this approach may have delivered short term benefits, the technical infrastructure which is left under the financial enterprise's control is ill-equipped to meet the demands of industry growth. To meet these demands requires financial enterprises to respond more rapidly to new market opportunities, economic changes and competitive threats. The complexity of IT infrastructure and applications which support the financial enterprises often inhibit the ability to respond rapidly while containing cost, and to deliver greater transparency.

Previous industry growth was achieved by rapid geographic expansion and mergers, both of which have left a legacy of increased complexity at a business level, an application level and a technical level. With a few notable exceptions, what has emerged is a significant duplication and redundancy at each of the above levels. This additional complexity had made it increasingly difficult to achieve many of the goals of cost cutting and the delivery of transparency mandated by many regulatory requirements.

Thus many financial service enterprises are left with trying to achieve organic growth and to operate an efficient and secure business on what has become a chaotic development and operational infrastructure. For example, it is not unusual for the average utilization of servers in a server farm to be between five percent and fifteen percent. This level of utilization is not efficient but it is not always easy to know which servers to remove from the server farm in order to increase the utilization rate.

The IT and application infrastructure is slowly becoming no longer fit for the purpose the business is beginning to demand from it. The rate of technology change is increasing and along with it there is an increase in the speed of take up of new technology. This is contributing to an unwieldy IT infrastructure and is not attuned to rapid change at the technology level or at the application level. In fact, some financial enterprises can now take longer to deploy a new software product release than the maintenance life cycle of the product itself, leading to increased operational risk. Further, it can also take longer to develop and deploy a new financial product than the window of opportunity for that product remains open.

It has now become apparent that current technology models can no loner sustain the increasing rate and pace of change that is demanded of it by the business. Hence there is a need within the art for a new technology model that is able to rapidly absorb a number of changing technical and business factors and parameters and thus evolve with the ever changing business environment. For this new model to be supported, the IT organization will need to develop new capabilities, such as technical infrastructure, development methods, operational competencies, skills and best practices.

SUMMARY OF THE INVENTION

The present invention provides a method as claimed in claim 1 and corresponding component, method and computer program that assesses the progress of an IT organization towards developing the capabilities required to achieve the business goals of an on-demand business.

Viewed from a first aspect the present invention provides a capability progress modelling component for determining the progress of adoption of an on-demand capabilities model by an organization, the deployment progress component comprising: a completion state descriptor component for receiving inputs from an entity describing a current state, a target state and a modelled state for the organization; and a state comparator component for comparing the current state and modelled state with the target state to derive a set of parameters, the state comparator component analyzing the set of parameters to determine deviation points indicating capability areas requiring attention in order for the organization to progress to an on-demand capabilities model.

Advantageously, the present invention provides a method, component and computer program product wherein an organization can rapidly assess their plans and progress with regards to the adoption of an on-demand capabilities model. The present invention determines the rate of adoption over a number of capability areas. For each capability area it is possible to view, graphically, an organization's current state, target state and a modelled state. For each capability area the present invention computes information detailing the organization's capability strengths and weaknesses for a capability area.

Viewed from a second aspect the present invention provides a method for determining the progress of adoption of an on-demand capabilities model by an organization comprising the steps of: receiving inputs from an entity describing a current state, a target state and a modelled state for the organization; comparing the current state and modelled state with the target state to derive a set of parameters; and analyzing the set of parameters to determine deviation points indicating capability areas requiring attention in order for the organization to progress to an on-demand capabilities model.

Viewed from a third aspect the present invention provides a computer program product loadable into the internal memory of a digital computer, comprising software code configured for performing, when said product is run on a computer, a process of determining the progress of adoption of an on-demand capabilities model by an organization, the computer program product comprising: program code configured for receiving inputs from an entity describing a current state, a target state and a modelled state for the organization; program code configured for comparing the current state and modelled state with the target state to derive a set of parameters; and program code configured for analyzing the set of parameters to determine deviation points indicating capability areas requiring attention in order for the organization to progress to an on-demand capabilities model.

Viewed from a fourth aspect the present invention provides a consultancy service for determining the progress of adoption of an on-demand capabilities model by an organization comprising the steps of: receiving inputs from an entity describing a current state, a target state and a modelled state for the organization; comparing the current state and modelled state with the target state to derive a set of parameters; and analyzing the set of parameters to determine deviation points indicating capability areas requiring attention in order for the organization to progress to an on-demand capabilities model.

BRIEF DESCRIPTION OF THE DRAWINGS

The novel features of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 12 is a flow chart detailing the operational steps of the capabilities progress modelling tool in accordance with a preferred embodiment of the invention.

BRIEF DESCRIPTION OF THE INVENTION

Figure 1:
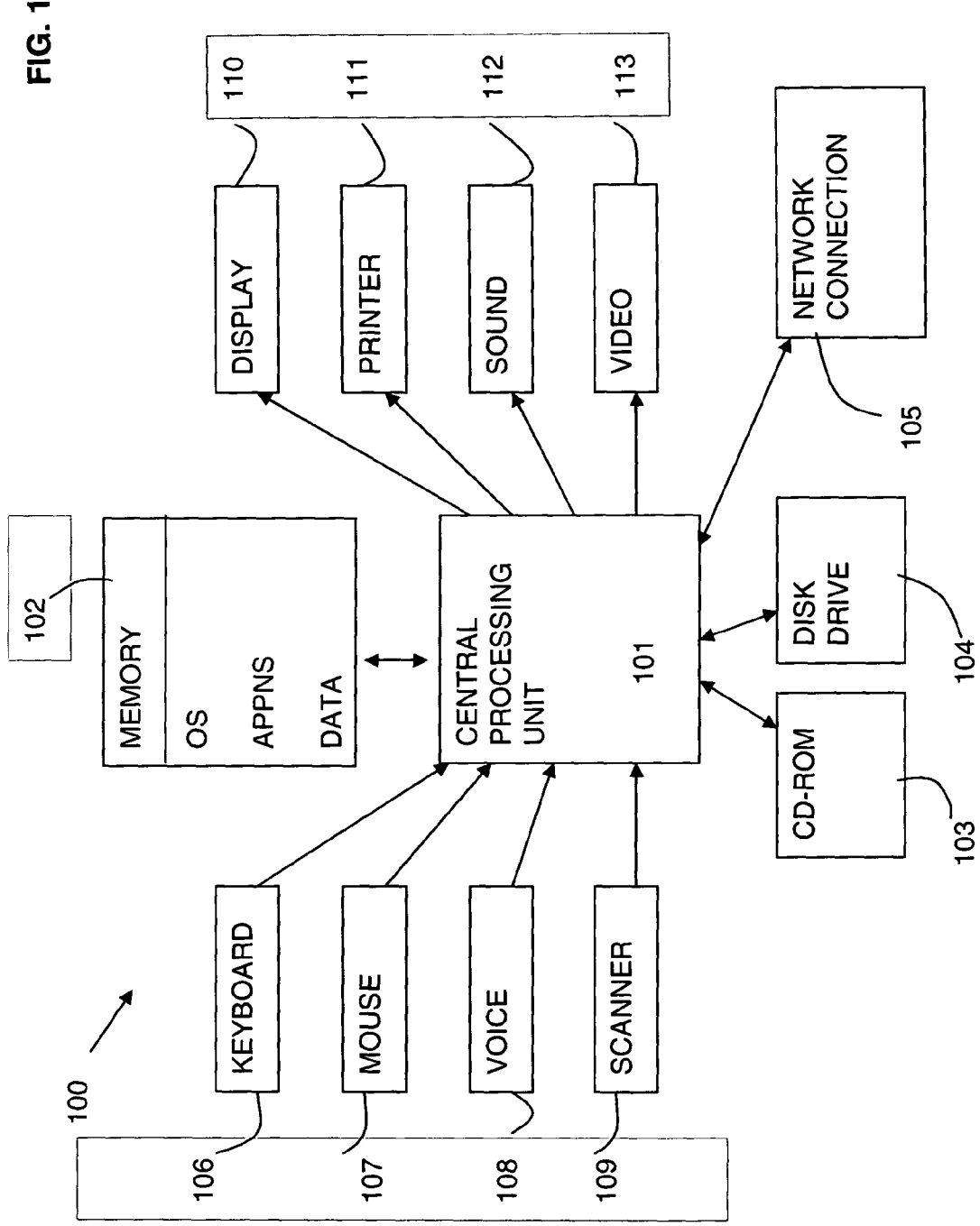
FIG. 1 illustrates a computer system in which the present invention may be implemented in accordance with a preferred embodiment of the invention.

Referring to FIG. 1, a computer system 100 is shown in which a preferred embodiment of the present invention may be implemented. A computer system 100 has a central processing unit 101 with primary storage in the form of memory 102 (RAM and ROM). The memory 102 stores program information and data acted on or created by the programs. The program information includes the operating system code for the computer system 100 and application code for applications running on the computer system 100. Secondary storage includes optical disk storage 103 and magnetic disk storage 104. Data and program information can also be stored and accessed from the secondary storage.

The computer system 100 includes a network connection means 105 for interfacing the computer system 100 to a network such as a local area network (LAN) or the Internet. The computer system 100 may also have other external source communication means such as a fax modem or telephone connection.

The central processing unit 101 comprises inputs in the form of, as examples, a keyboard 106, a mouse 107, voice input 108, and a scanner 109 for inputting text, images, graphics or the like. Outputs from the central processing unit 100 may include a display means 110, a printer 111, sound output 112, video output 113, etc.

In a distributed system, a computer system 100 as shown in FIG. 1 may be connected via a network connection 105 to a server on which applications may be run remotely from the central processing unit 101 which is then referred to as a client system.

Applications may run on the computer systems 100 from a storage means 103, 104 or via a network connection 105 which may include spread sheet applications, modelling tools and database applications and other storage and retrieval mechanisms.

Figure 2:
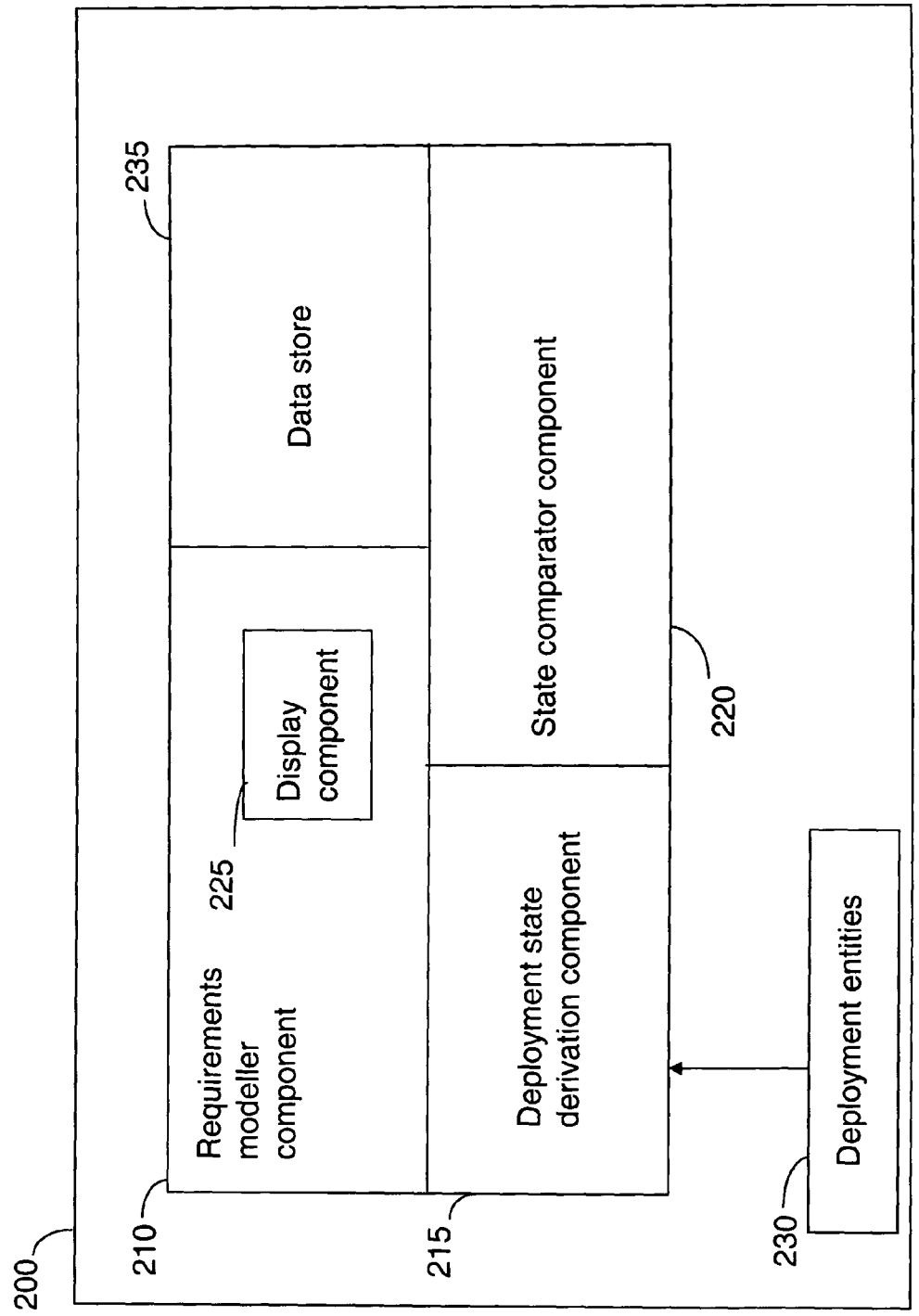
FIG. 2 is a block diagram depicting the operational components of the capability progress modelling component in accordance with a preferred embodiment of the invention.

FIG. 2 shows the components of a preferred embodiment of the present invention. The present invention provides an enhancement to current methodology and business modelling tools in the form of a capability progress modelling component (CPM) 200 which determines the level of adoption of an on-demand operating capabilities model by the organization over a particular time period. For example, detailing further capabilities that need to be obtained to achieve enterprise wide capability to deploy portal applications.

The CPM 200 analyses data from external sources 230 in order to determine the progress made by an organization in their progression towards an on-demand operating capability model. An output is produced which can be modelled into a number of different graphical reports for review by a user with suggestions for improvement. The CPM 200 may be installed as a stand-alone component on a computer system 100 or as an add-on component which interacts and interfaces with existing business modelling tools.

The CPM 200 comprises a number of sub components which interact with each other in order to process data received from a number of external sources. The components of the CPM 200 comprise a deployment state derivation component 215, a state comparator component 220, a requirements modeller component 210 having a display component 225 and a data store 235.

The deployment state derivation component 215 receives input from deployment entities 230, such as, data gathered from users from business alignment workshops or data feeds from external devices, etc. The input comprises data pertaining to the current state, target state and model state of the operating capabilities of the organization. The current state being where an organization believes their capabilities to be now (i.e. at a particular point in time) and the target state being defined as where the organization wants their capabilities to be at the end of a particular period (e.g. in a few years time).

The capabilities of an organization comprise competencies, technical skills, business skills, development methods, best practices and IT infrastructure, etc., which contribute to the overall ability to become an on-demand business.

The deployment derivation component 215 receives the input and maps the input into data categories for storing in a data store 235. On update of the data store 235 the deployment state derivation component 215 communicates an acknowledgement request to the state comparator component 220.

The state comparator component 220 on receipt of a communication from the deployment state derivation component 215 performs a comparator operation in order to determine the progress of adoption of the on-demand operating capabilities by the organization for the current state and that required by the target state.

The output of the state comparator component 220 is communicated to the requirements modeller component 210 for modelling the data into a number of reports for further analysis by a user via the display component 235. The requirements modeller component 210 interacts with the state comparator component 220 to receive suggestions for displaying to the user in which areas actions should be performed in order to complete the organization's transformation towards an on-demand operating capabilities model.

Figure 3:
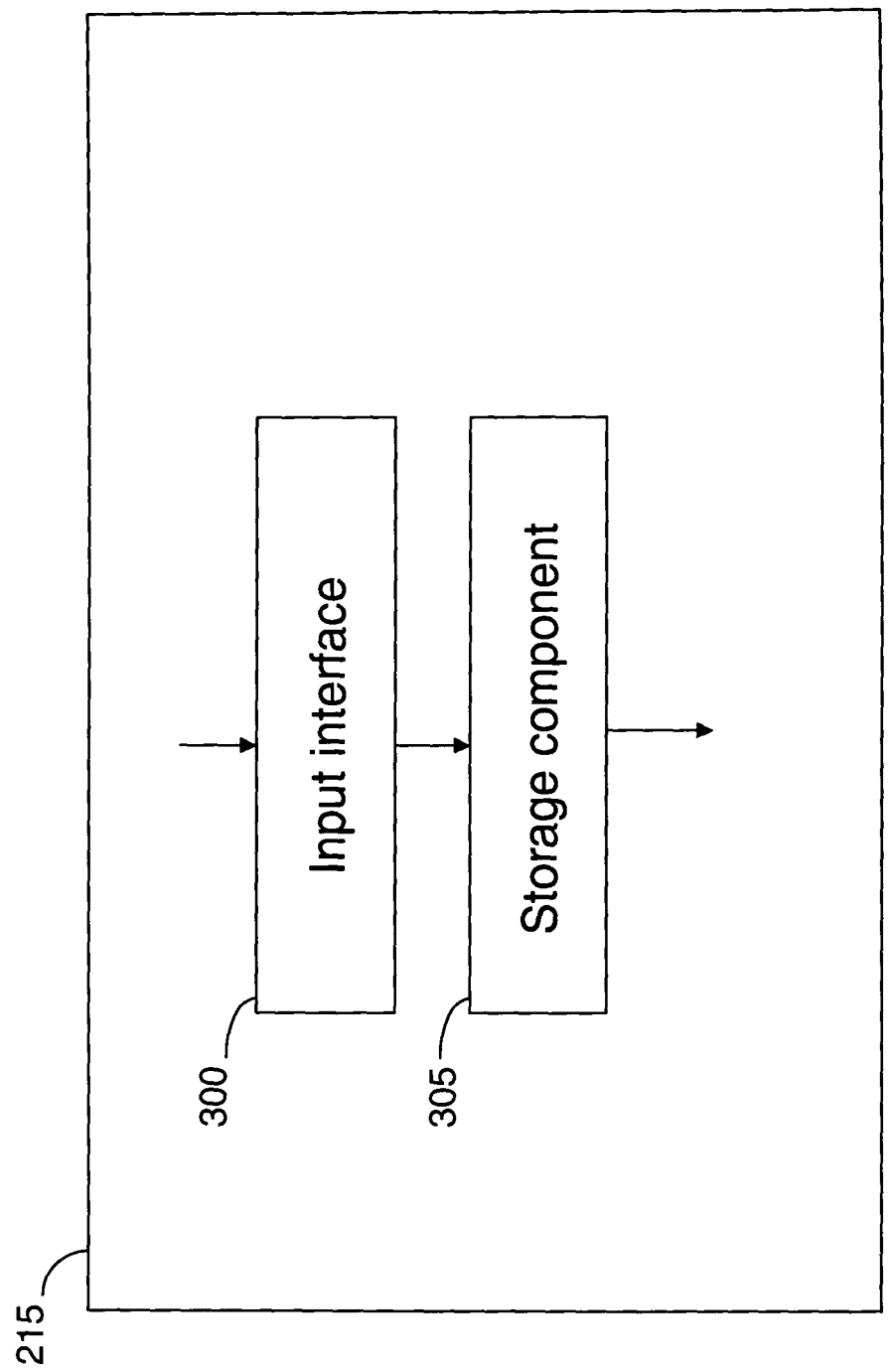
FIG. 3 is a block diagram illustrating the components of the deployment state descriptor component in accordance with a preferred embodiment of the invention.

Referring to FIG. 3 the components of the deployment derivation component 215 are shown. The components comprise an input interface 300 and a storage component 305.

The deployment state derivation component 215 receives inputs, via an input interface 300, from a user. The purpose of the input interface 300 is to receive data regarding an organization's capability in a number of key areas. Thus, the input interface provides a graphical user interface 300 for inputting data into data input fields. The input may be in the form of responses to questions or via other suitable prompt means.

The data input fields may be categorised into categories or swim lanes; each category representing different organizational capabilities. For example, the categories may comprise service capabilities pertaining to an enterprise user domain, an enterprise development domain, an enterprise process domain, an enterprise information domain and an enterprise infrastructure management domain, a physical infrastructure category to assess the use of technology, an application function services category to assess the degree of transformation on going in the application domain and a business services category to assess the transformation at a business level.

Examples of the types of questions that may be used in a particular category are as follows:

Business Services

To what degree have shared business components and common process been implemented that can be used across lines of business?

Application Function Services

What is the level of progress in application rationalism?

Development Domain Services

What evidence is there of Enterprise Architecture tooling being integrated with the application software development process?

Information Domain Services

To what extent are model, strategies and architectures deployed to control cross line of business access to data?

User Domain Services

To what degree can users access applications they need from a single desktop?

Process Domain Services

What evidence is there of business function being exposed internally and accessed as web services?

Infrastructure Management Domain Services

To what extent is IT service development focused in the adoption of common standards for quality of service automation, notification and management?

Physical Infrastructure

What is the level of progress in physical infrastructure rationalization either within organizational silos or across silos?

For each question presented to a user, the user is prompted to give a rating or an indication of how the organization's behaviour demonstrates the required characteristics. The rating may be a simple yes/no answer or a numerical value for example, a value from one to five or one to ten. The range of values representing the degree of capability at each level of maturity of adoption of an integrated on-demand business capability. For example, discrete, partial integration, enterprise integration up to dynamic collaboration, etc. This set of ratings determines the modelled state of the organization.

On completion of the questions and ratings a submit button is provided to commit the input data to storage. The storage component 305, before committing the received data to storage, performs a check to determine whether a previous set of data has been stored in the data store 235. If no previous data is stored, the storage component 305 proceeds to store the input data in the data store 235. If data has been previously stored the storage component 305 creates a new entry for the input data and stores the input data in the data store 235. Once stored, the storage component 305 transmits a communication to the state comparator component 220 informing on the newly stored data.

Figure 4:
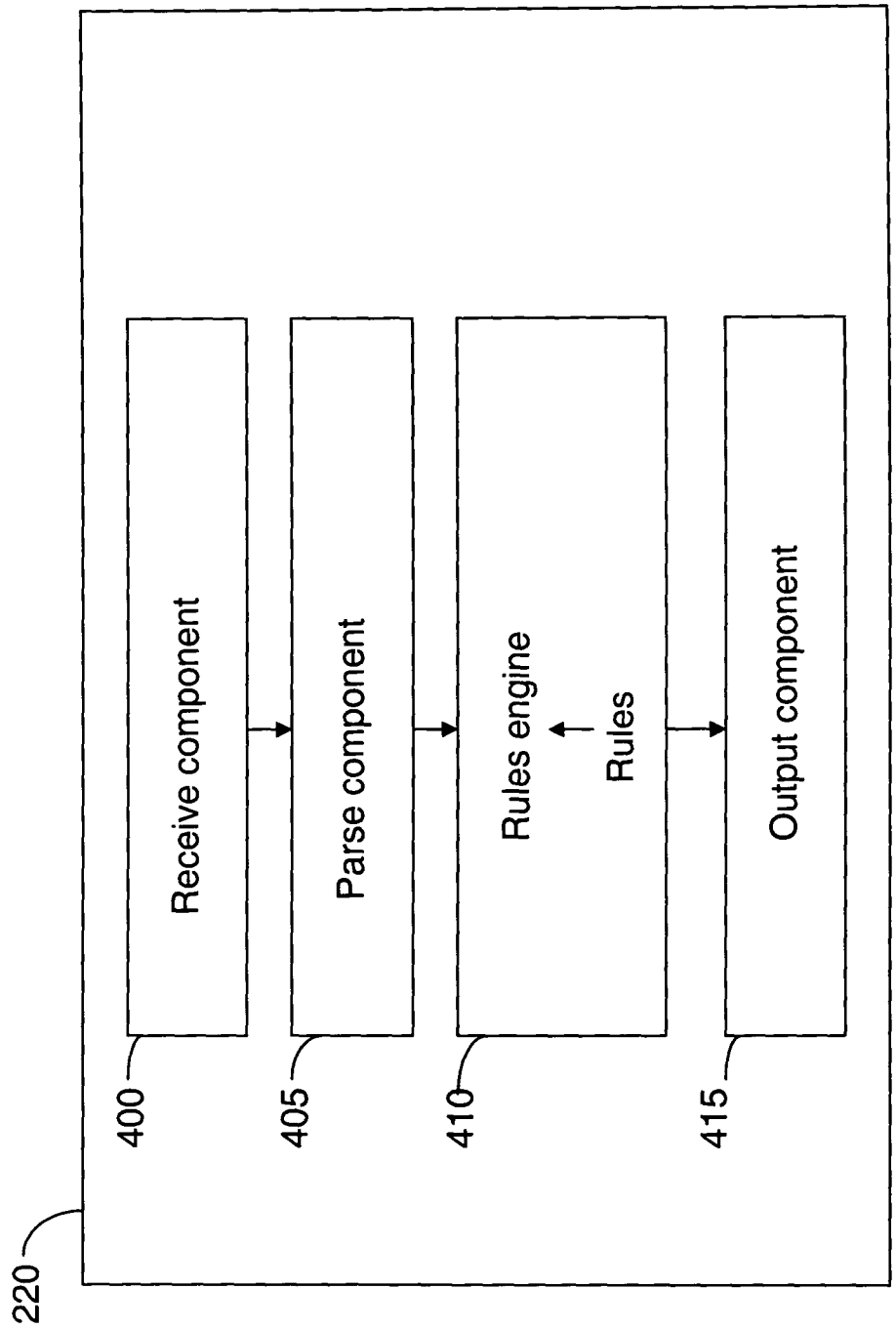
FIG. 4 is a block diagram illustrating the components of the state comparator component in accordance with a preferred embodiment of the present invention.

Moving on to FIG. 4, the state comparator component 220 comprises a receiving component 400, a parsing component 405, a rules engine 410 and an output component 415. The receiving component 405 receives communications from the deployment state derivation component 215. On receipt of the communication the receiving component 400 requests the current state, the target state and the modelled state of the organization from the deployment state derivation component 215. Once received, the parsing component 405 parses each set of input data received and builds a data map comprising the current state of the organization, the target state of the organization and the modelled state of the organization. The data map is sent to the rules engine 410 and rules are applied to determine the level of adoption of maturity in respect to the current state of the organization and the modelled state of the organization to determine a number of deviation points signifying areas in which the organization needs to improve. The deviation points are represented to the user via graphical outputs and translated into metrics representing these states. The current state and modelled state are also compared to the target state, and further metrics define the scale of a gap to be closed to achieve the target state from both the current and modelled states.

The output from the state comparator component 220 is communicated to the requirements modeller component 210 for producing a series of numerical and graphical outputs for displaying to the user, via a display component 235, in a meaningful manner.

Figure 5:
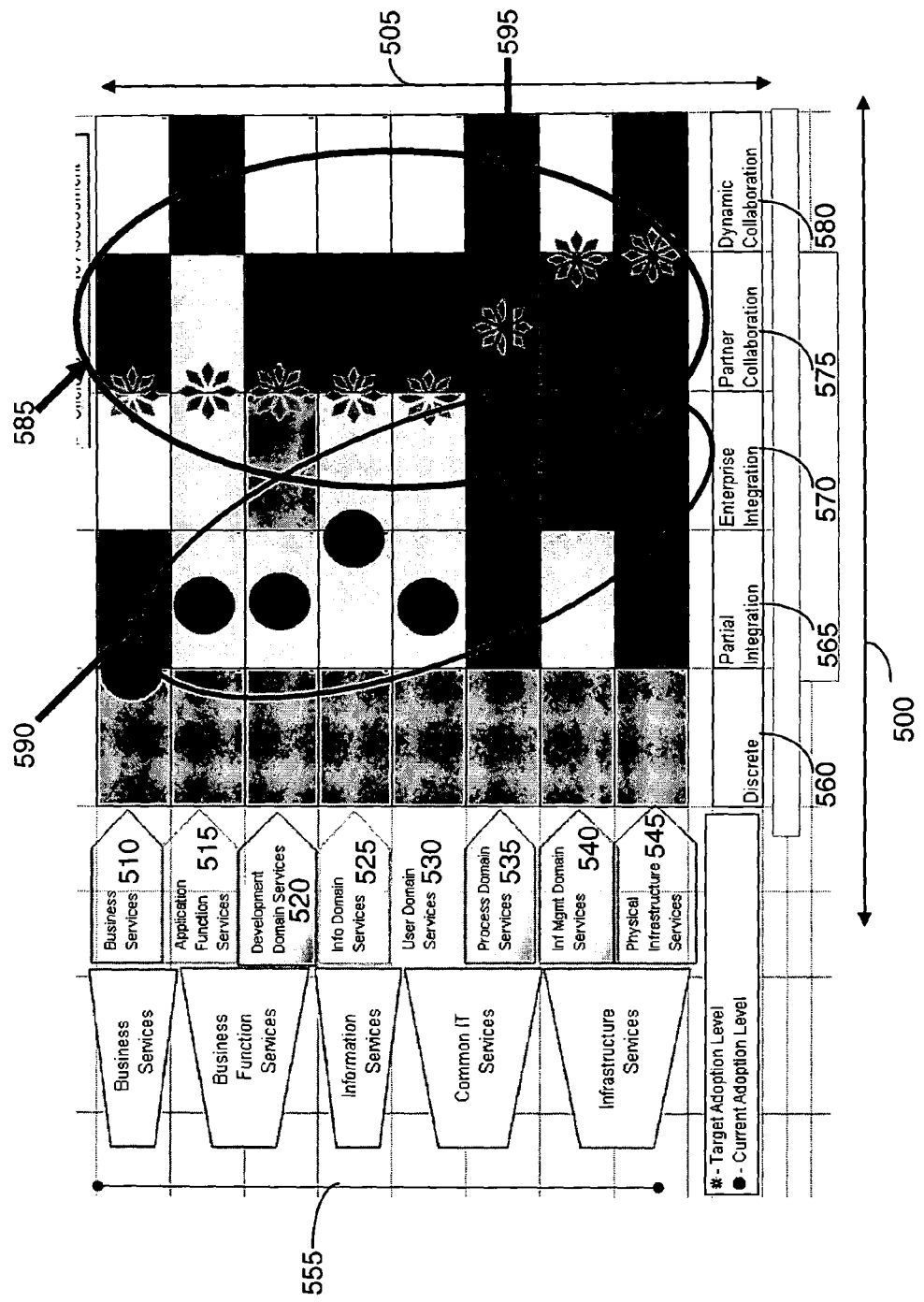
FIG. 5 shows an output of the modeller requirements component in accordance with a preferred embodiment of the invention.

Moving on to FIG. 5 an example of the output of the requirements modeller component 210 is shown.

The output is in the form of a grid of squares 500, 505. Each square in the grid represents an area of capability which requires enterprise wide governance in order to achieve an on-demand operating capability for the organization. For example, capabilities such as business services 510, application function services 515, development domain services 520, information domain services 525, user domain services 530, process domain services 535, information management domain services 540 and physical infrastructure services 545. These areas are also categorised by higher level categories 555 such as business service, business function services, information services, common IT services and infrastructure services. Along the y axis 500 the various levels of maturity of adoption towards on-demand business capability are displayed, i.e., discrete 560, partial integration 565, enterprise integration 570, partner collaboration 575 and dynamic collaboration 580. It will be appreciated by a person skilled in the art that other categories of information can be used to achieve the same effect.

In the example of FIG. 5, there are three main elements to the grid, i.e.:

1. A graphical representation of the estimated current state of the organization. In the example of FIG. 5 the current state is represented by a series of circular indicators 590, but other forms of graphical representation will suffice.

2. A graphical representation of the estimated target state 585 of the client organization. In the example of FIG. 5, the target state is represented by a series of stars, but other forms of representation may be used.

3. A graphical representation of the answers to the pre-assessment questions which determine the modelled state. In the example of FIG. 5, the answers are represented by the colored cells 500, 505. In the example of FIG. 5 this is represented by the colors black, white and various shades of grey, for example:

Black—the organization has deliberately chosen to exclude a level of capability from their business model White—It is derived as uncertain whether the organization has recognized this need and therefore taken action.

Dark grey—the organization has not yet established a program or set of initiatives/solutions to implement in this area.

Medium grey—the organization is in the early stages of a program of initiatives to develop capability in this area.

Light grey—the organization has a well established program of initiatives in this area.

The current and target states representations 585, 590 provide a top down assessment of the organizations progression to an on-demand operating capability based on the users subjective view, whereas the cell coloring of the grid represents a bottom up assessment of the organization's demonstrable performance in particular capability areas.

The state comparator component 220 begins by assessing the representations to identify any anomalies between a top down assessment and a bottom up assessment. For example, the state comparator component 220 traverses each capability area 510-545, represented by the grid of cells 500, 505, to identify the modelled state and identifies which cells 500, 505 the indicators 590, 585 are positioned (the indictors representing the current state and the target state for each capability area).

For example, the state comparator component 220 identifies, in FIG. 5, that indicator 595 is positioned at the intersection of the partial integration cell 565 and enterprise integration cell 570 for the process domain service capability 540 as an anomaly that requires further investigation since the user's view of the current state is not supported by evidence of demonstrable performance.

The state comparator component 220 performs further analyses based on the individual cell coloring to identify any major areas where information is missing or where the organization has excluded capability from their business model. The findings of such evidence by the state comparator component 220 may indicate the need for better understanding of the organization's strategy in a specific area, or a lack of organizational acceptance of an on-demand strategy.

The state comparator component 220 performs a third analysis to identify any specific cell 500, 505 of the grid which appear to be out of line, e.g., a black or white cell to the left of a dark grey cell, etc. This may indicate a specific problem in the organization's environment that should be investigated further or perhaps that the pre-assessment questions should be explored in greater depth. If there is more than one cell 500, 505 with this type of behaviour then a full assessment may be considered appropriate.

It is shown in FIG. 5 that the top down assessment of the current state is, in most cells 505, in an advance of the actual state as suggested by the answers to the pre-assessment questions. This indicates that the user is over-optimistic about the on-demand operating capabilities of the organization as a whole. This would indicate a significant risk of establishing business plans or goals that are unsupportable by the IT organization.

In this instance, the state comparator component 220 may suggest further investigation to be carried out to determine what has led to this situation. One suggestion may be to revisit the inputs to the pre-assessment questions. A second option may be to carry out a full assessment. A third option may be to repeat the pre-assessment questions with the organization at the chief information officer level.

Figure 6:
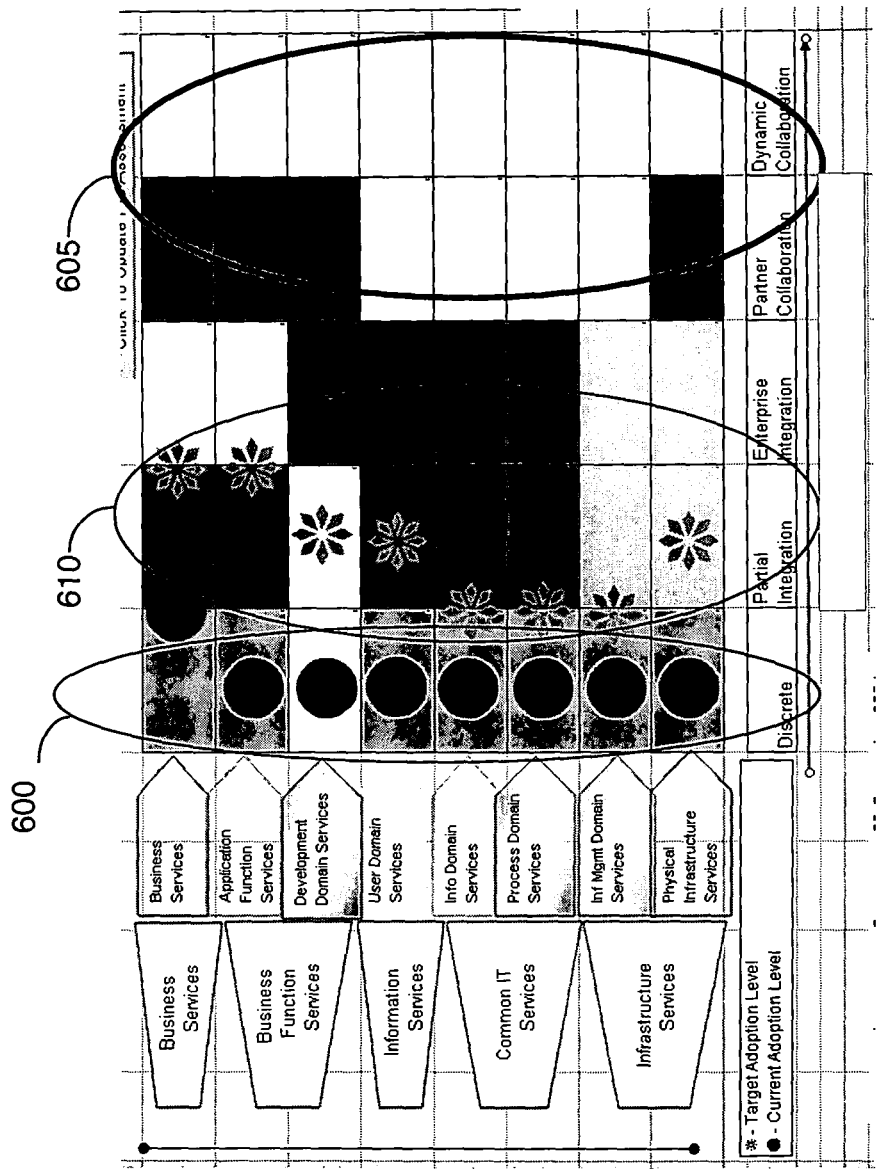
FIG. 6 shows another example of an output of the modeller requirements component in accordance with a preferred embodiment of the present invention.

With reference to FIG. 6, a different scenario is shown as computed by the state comparator component 220 and displayed by the display component 235 of the requirements modeller component 210. In this example, a large cluster of white cells 605 towards the right hand side of the grid is displayed and the indicators 600 are aligned vertically within the discrete column against a backdrop of light grey cells.

The presence of a large number of white cells 605 at the right of the grid preceded in most lanes by grey cells indicates the organization has yet to 'buy into' the principle of an on-demand business. This evidence is further compounded by the positioning of the target state 610 in the medium grey cells, which suggests a low ambition in terms of achieving an on-demand operating environment. Thus suggestions are provided to suggest an appropriate course of action.

Figure 7:
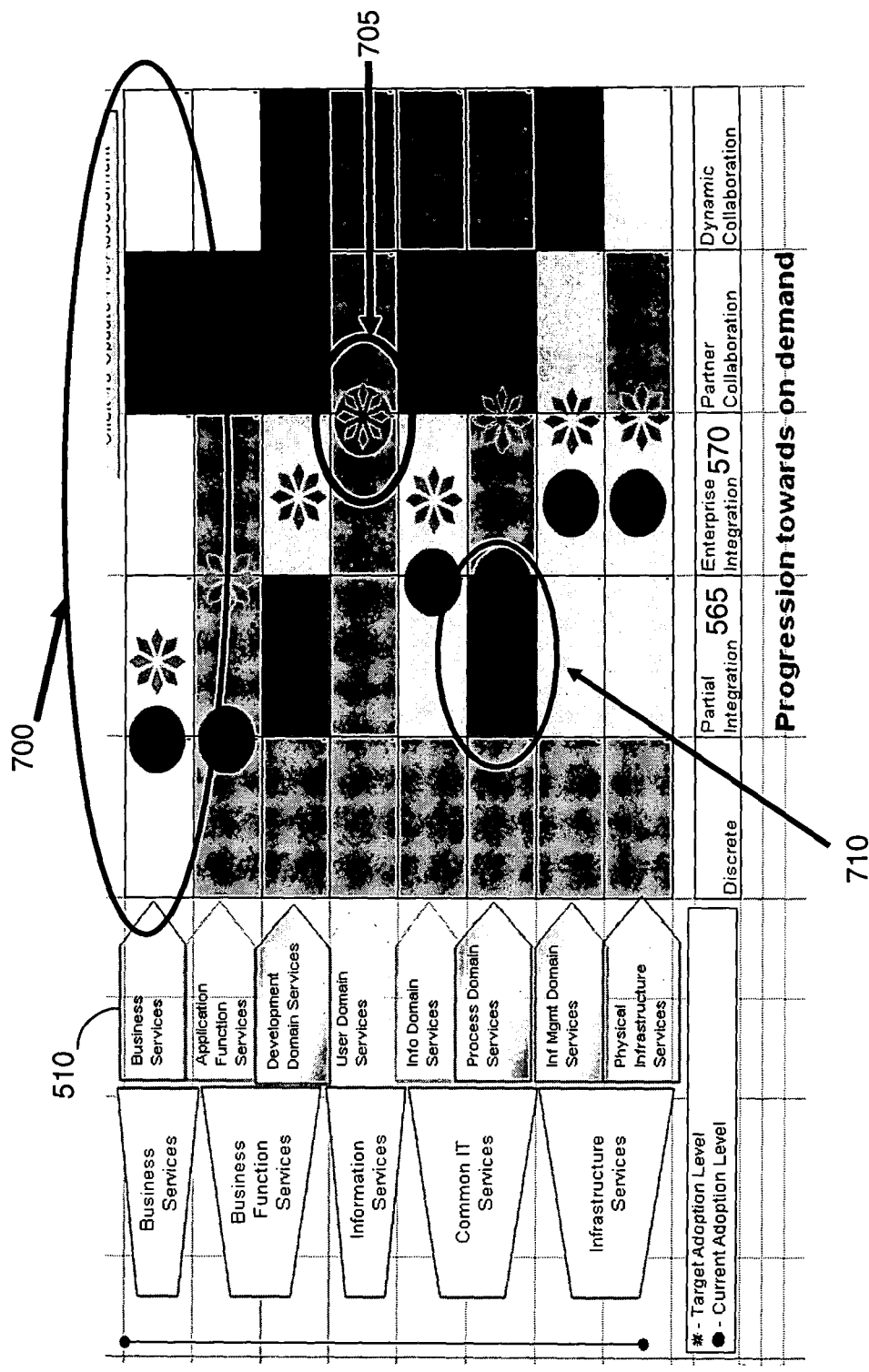
FIG. 7 shows another example of an output of the modeller requirements component in accordance with a preferred embodiment of the present invention.

In FIG. 7, the state comparator component 220 detects that a number of white cells 700 lay across nearly all the business service 510 category. The state comparator component 220, using a number of rules may determine that this indicates that an IT service provider's relationship with the organization does not allow the identification of state in the business service area, or the true aspirations of the business. As a result the organization may not be able to plan effectively the appropriate level of IT capability necessary to support he business.

Alternatively, the state comparator component 220 may determined that this is an indicator of the relationship between the Business and the IT infrastructure hindering access to required information.

Further analysis by the state comparator component 220 further determines that cell 710 which is positioned at the intersection of partial integration 565 and process domain services 535 is an anomaly that requires further investigation. The action suggested by the state comparator component 220 may be to review the characteristic definition of this cell and the initiatives or capabilities required to change its status, for example to change the status from a partial integration 565 state to an enterprise integration 570 state.

For user domain services, the current and target states overlap 705.

Figure 8:
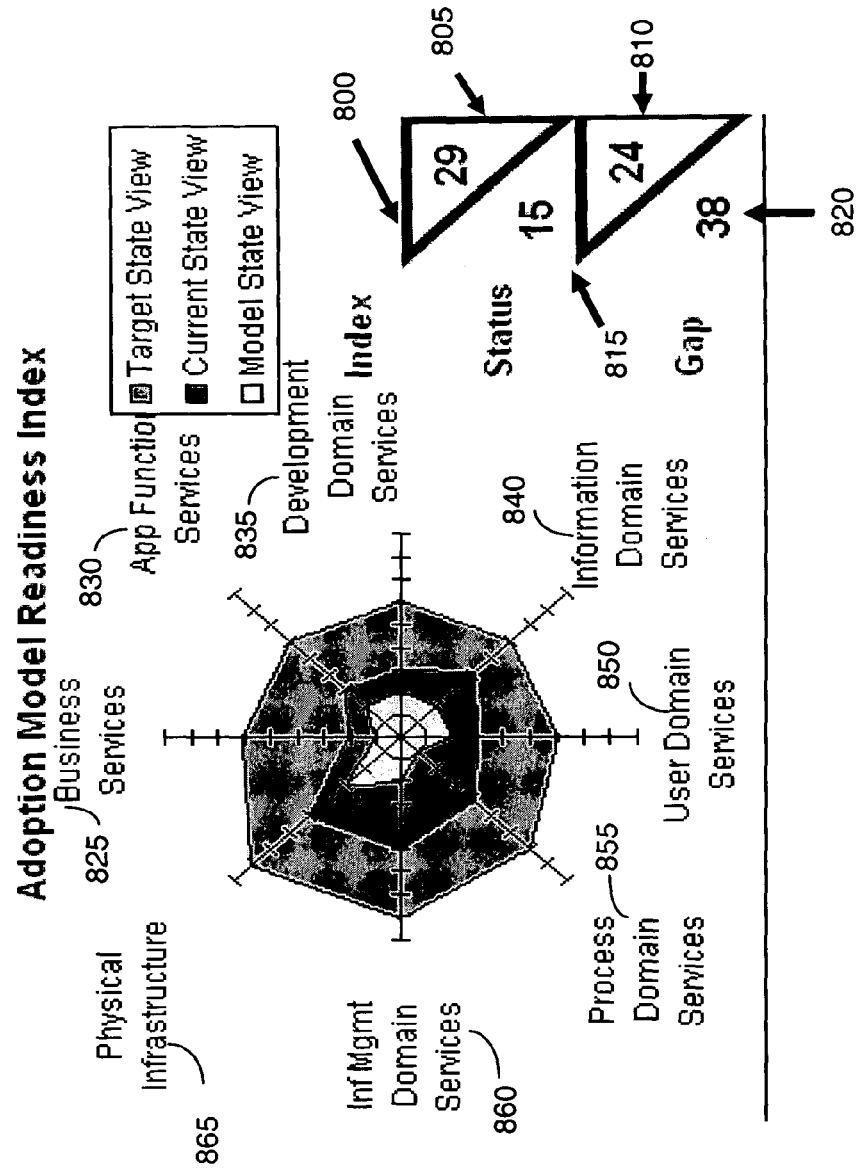
FIG. 8 shows an example of an adoption readiness index in accordance with a preferred embodiment of the present invention.
Figure 9:
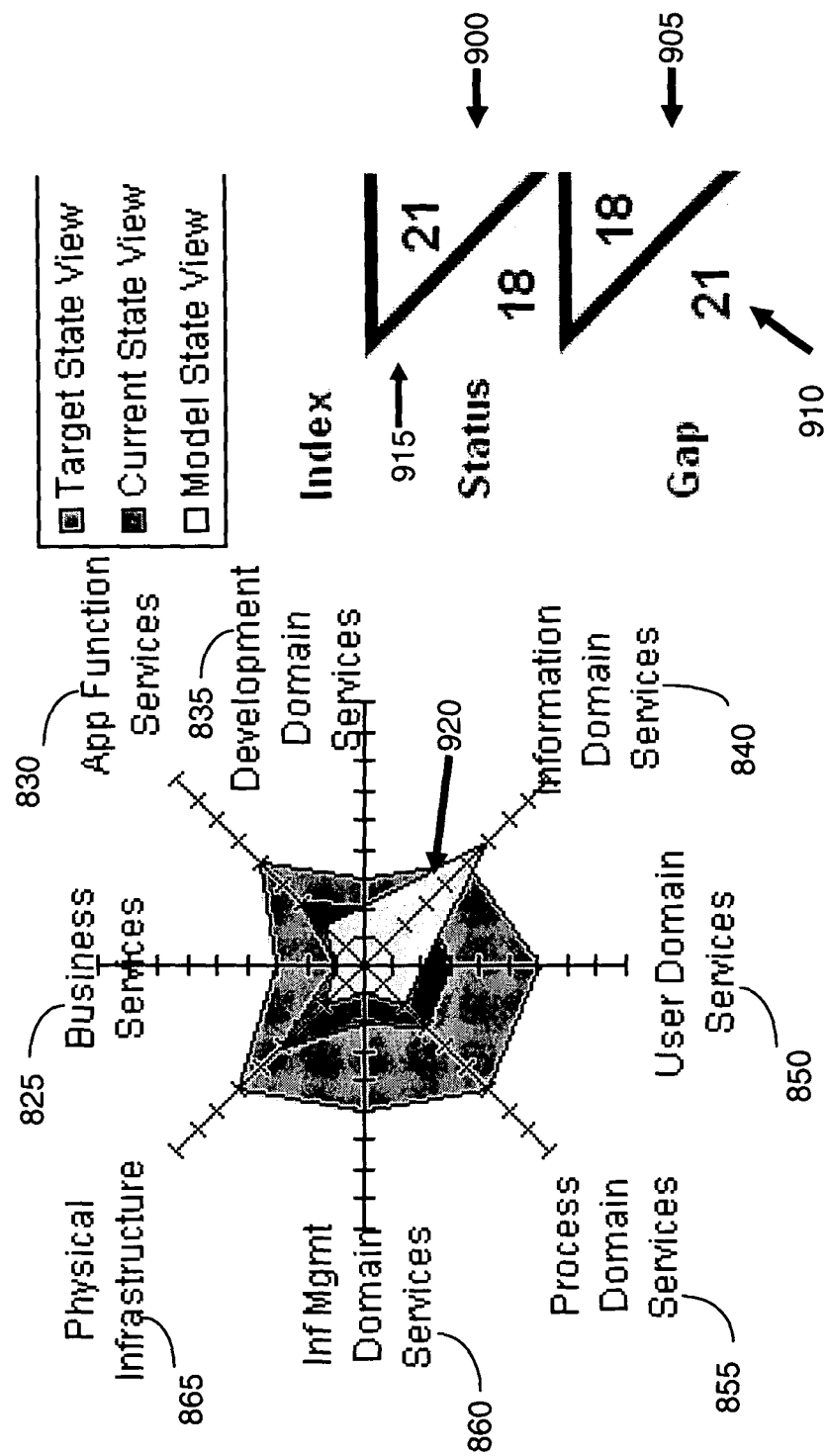
FIG. 9 shows another example of an adoption readiness index in accordance with a preferred embodiment of the present invention.

FIGS. 8 and 9 show an adoption model readiness index. The purpose of the index is to help in the prioritisation of actions across the various swim lanes of the adoption model and also to record metrics associated with current and target state which can be used as a means of comparison with industry, geography and sector or customer type over a period of time.

FIG. 8 shows an adoption model readiness index 800 which depicts the target state of the organization, the current state of the organization and the model state of the organization.

The graph shown a number of capability lanes, each capability lane is represented by an axis, in this example there are eight axes, i.e., a business services axis 825, an application function services axis 830, an information management axis 835, a process domain services axis 840, a user domain axis 845, an infrastructure management domain axis 850, a development domain axis 855, an infrastructure management domain axis 860 and a physical infrastructure axis 865. Against each axis, the index 800 for the model state (light grey), current state (dark grey) and target state (medium grey) are represented by different shades of grey working outwards from the center of the graphic.

The state comparator component 220 derives a set of index scores 800 for the totality of the domains which represent the current state and the gap to the target state or the modelled state and the capability gap to the target state. In this example the state comparator component 220 calculates status and gap index scores for the current state of 29 and gap to the target state of 24 is determined. The modelled state and gap to target state are given indices of 15 and 38 respectively which indicates the organization still has to make progression in a variety of domains.

In the example of FIG. 8, the current state assessment has exceeded that determined by the model in all capabilities since the light grey area on the graphic representing the model state is contained wholly within the darker grey middle area representing the current state.

FIG. 8 highlights that the biggest degree of change required between modelled state and target state is on the process domain services sector 855 and the business services domain 825. However, the degree of change is large in all capability lanes. This is depicted by the relatively high gap number of the readiness index. The higher the gap index the greater the challenge in building a roadmap for moving to an on-demand business. Any approach that tries to map back from the target state to the current model state will generate a road map with multiple alternatives that could be potentially difficult to prioritise and execute. In such a scenario it may be preferable to reset the target state before attempting a full assessment of appropriate actions.

FIG. 9 illustrates a further example wherein for at least one domain 920 (the information domain services 840), the model view is in advance of the current view for that domain 920. Thus the state comparator component 220 may suggest that priority should be given to the other areas represented by each domain 825 to 865 where there is a significant identified gap. In this example, any roadmap built will need to determine the impact it has in the information domain ensuring it supports but does not negate capability in this area. Again, the state comparator component 220 calculates an adoption readiness index 910 for this view. In this example, the state comparator component 220 calculates status and gap index scores for the current state of 21 and gap to the target state of 18. The modelled state and gap to target state are given indices of 18 and 21 respectively—which in this example implies that the organizations current view of the capabilities in not far away from their view of their target state.

Figure 10:
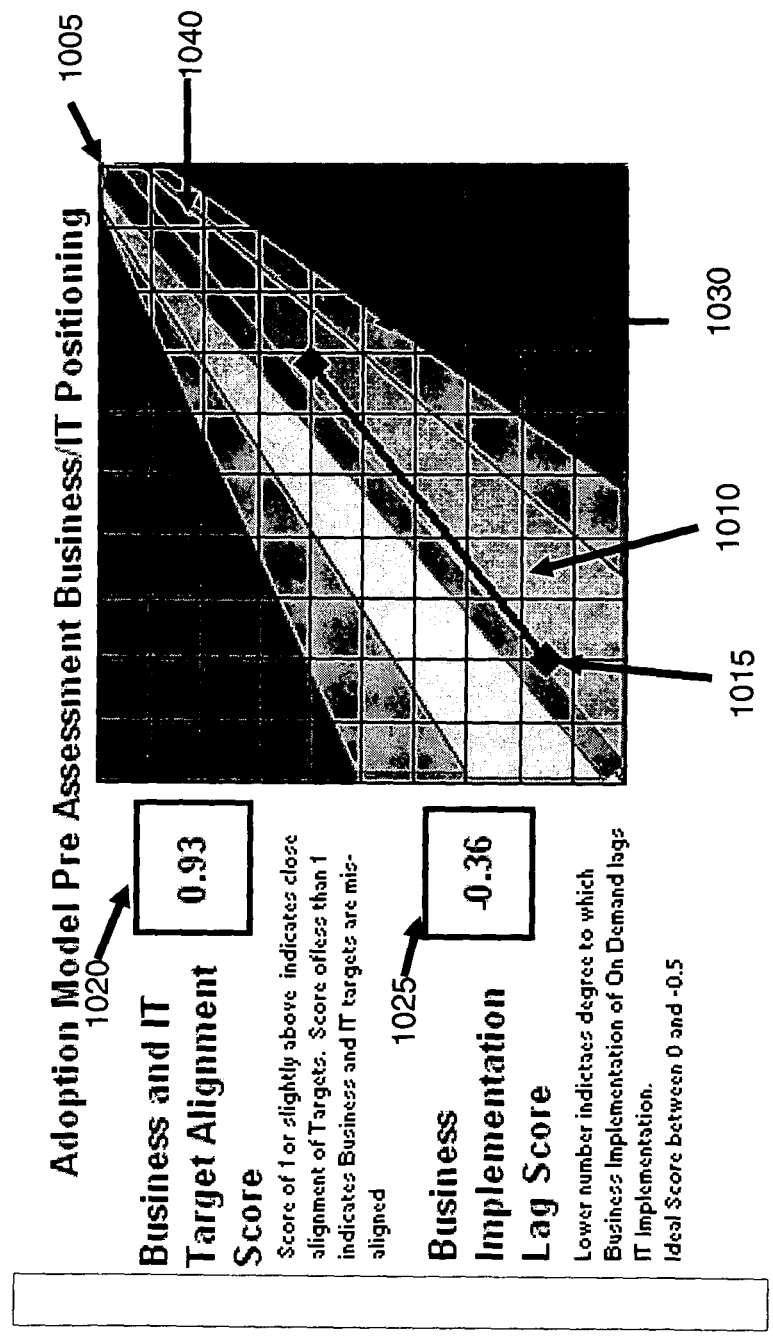
FIG. 10 shows an example of a computed pre-assessment business and IT positioning chart in accordance with a preferred embodiment of the present invention.
Figure 11:
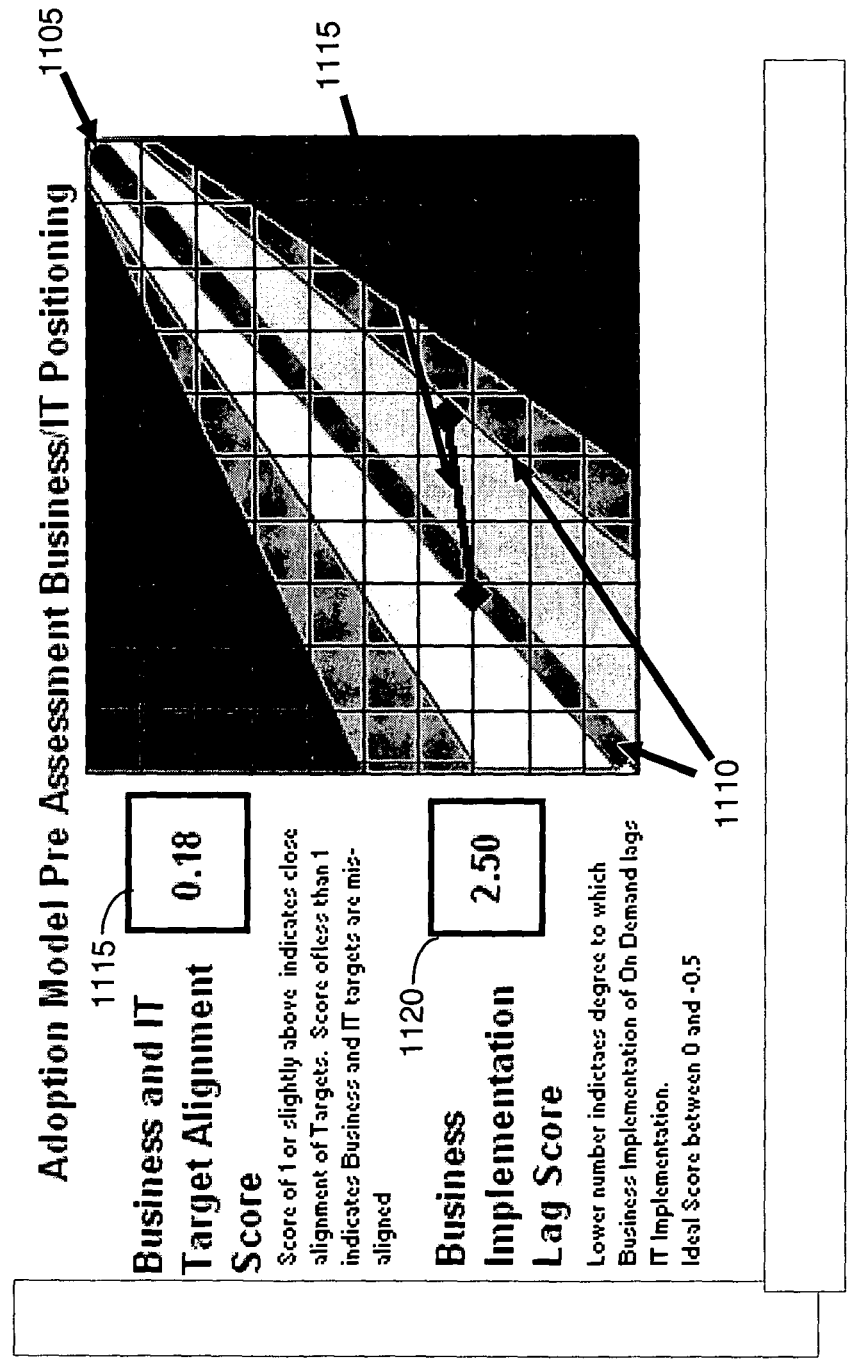
FIG. 11 shows another example of a computed pre-assessment business and IT positioning chart in accordance with a preferred embodiment of the present invention.

FIGS. 10 and 11 show examples of adoption model pre-assessment business/IT positioning graphs. These graphs provide a view of the alignment of business and IT in terms of their vision represented by the target state and the state of current implementation in the journey towards an on-demand operating capabilities model for the organization.

Each chart illustrates a grey set of converging pathways 1005 representing the alignment of business capability vertically and IT capability horizontally. The most desired path is where these capabilities are in balance on the rising diagonal 1030 or where IT capability is slightly ahead of business capability just below the rising diagonal 1030. A dark line segment 1015 represents the path projected between the modelled state and target state for this assessment.

The state comparator component 220 compares the modelled state and the target state as provided by the deployment state derivation component 215. The results are transmitted to the requirements modeller component 225 and plotted on a grid to allow comparison with an ideal pathway (shown as a solid line in the middle of the chart 1040). In this way the state comparator component 220 may identify situations may be identified where modelled state or target state is misaligned between the business intention and the IT capabilities.

The state comparator component 220 computes two metrics derived from the ideal path 1005 and the projected path 1015. The first metric is a business and IT target alignment score 1020 which provides a numerical value associated with the degree of change required for the business to achieve its target in comparison with the degree of change required across IT capabilities. A score of 1 or very close to it (in the range of 0.75 to 1.25 for example) indicates good alignment of the business and its IT capabilities. A score of less than 0.5 or greater than 1.5 indicates that business and IT visions are not aligned. A person skilled in the art will appreciate that other values may be used other than those discussed above.

The second metric is a business implementation lag score 1025 which indicates the degree to which the business implementation of on-demand capability lags that of the IT infrastructure. Ideally this value should be between −0.5 and 0. A large positive value indicates that business implementation is significantly ahead of the IT capabilities and/or the IT vision is significantly in advance of the business vision. A large negative value indicates that the IT capabilities are significantly ahead of business implementation and/or the business vision is significantly ahead of the IT vision for an on-demand business. A person skilled in the art will appreciate that other values may be used other than those discussed above. Referring to FIG. 11, a scenario is illustrated where the business and IT alignment is displayed close to the model value. This is indicated by the positioning of a diagonal indicator 1115 which is confined to the light grey pathway 1110.

Positioning of the indicator 1115 in the light grey area would be an acceptable alignment but because it may indicate that the business implementation is ahead of the IT implementation then there is the potential for the issues to arise as the organization progresses. Fundamentally it is better if the IT implementation is slightly in advance of the business of that The IT infrastructure can respond to business changes as apart of its move to being an on-demand organization rather than impede its progress.

Positioning of the indicating line 1115 in the dark grey or medium grey areas indicate potential for significant misalignment of business and IT plans. The length of the indicator line also indicates the gap between current state and target state and again is an indicator that the roadmap in this instance will be complex to develop so re-focusing of the target may be required.

FIG. 11 also shows another example wherein the IT vision is in advance of the business vision. This is depicted by the indicating line 1115 being displayed across two swim lanes 1110. If this scenario were allowed to continue there is a danger that the organization's IT capabilities may not be supported by the business requirements when business change is identified. This could lead to loss of sponsorship of IT from within the business or add to operational costs by supporting an over-capable IT operation. Again a business and IT target alignment score 1120 and a business implementation lag score 1125 is calculated indicating the progress still required by the organization in the IT domain and the business domain in order to fully adopt an on-demand capability model.

FIG. 12 shows a flow chart illustrating the operational steps of the invention. At step 1200 the state comparator component 220 receives the current state, the target state and the modelled state from the deployment state derivation component 215. At step 1210, the state comparator component 220 compares the received input data to derive a set of statistical parameters 1220 and produces a set of deviation parameters at step 220. The state comparator component 220 transmits the statistical data set to the requirements modeller component 210 and at step 1230 the requirements modeller component 210 analyses the statistical data set to determine the level of adoption of an on-demand operating capabilities by the organization.

What is claimed is:

1. A method for determining the progress of adoption of an on-demand capabilities model by an organization, said method comprising:
   receiving input data from an entity, said input data describing a current state, a target state, and a modelled state for the organization, said current state pertaining to current capabilities of the organization, said target state pertaining to capabilities that the organization wants to possess at an end of a specified period of time, said modelled state being a state of conformity by the organization to required characteristics;
   a computer processor analyzing the received input data to determine parameters pertaining to the current state, the modelled state, and the target state; and
   displaying a graph that depicts said parameters, wherein the graph depicts said parameters for each business capability of a plurality of business capabilities, wherein the graph comprises a three-dimensional perspective view of an alignment of a business capability of the organization with respect to an information technology (IT) capability of the organization, and wherein the method further comprises:
      determining a first metric equal to a numerical value associated with a degree of change required for the organization to achieve the target state for the business capability in comparison with a degree of change required across the IT capability; and
      determining a second metric equal to a numerical value associated with a degree to which a business implementation of the on-demand capability lags that of the IT capability, wherein the graph comprises the first metric and the second metric.

2. The method of claim 1, wherein the plurality of business capabilities consist of services consisting of business services, application function services, development domain services, information domain services, user domain services, process domain services, information management domain services, and physical infrastructure services.

3. The method of claim 1, wherein the graph comprises an ideal path in which the business capability equals the IT capability and a projected path between the modelled state and the target state for the business capability.

4. A computer program product comprising:
   a computer readable storage medium having software code stored therein, said software code when executed on a processor of a computer system causes the processor to perform a method for determining the progress of adoption of an on-demand capabilities model by an organization, said method comprising:
   receiving input data from an entity, said input data describing a current state, a target state, and a modelled state for the organization, said current state pertaining to current capabilities of the organization, said target state pertaining to capabilities that the organization wants to possess at an end of a specified period of time, said modelled state being a state of conformity by the organization to required characteristics;
   analyzing the received input data to determine parameters pertaining to the current state, the modelled state, and the target state; and
   displaying a graph that depicts said parameters, wherein the graph depicts said parameters for each business capability of a plurality of business capabilities, wherein the graph comprises a three-dimensional perspective view of an alignment of a business capability of the organization with respect to an information technology (IT) capability of the organization, and wherein the method further comprises:
      determining a first metric equal to a numerical value associated with a degree of change required for the organization to achieve the target state for the business capability in comparison with a degree of change required across the IT capability; and
      determining a second metric equal to a numerical value associated with a degree to which a business implementation of the on-demand capability lags that of the IT capability, wherein the graph comprises the first metric and the second metric.

5. A computer system comprising:
   a processing unit configured to execute software code to perform a method for determining the progress of adoption of an on-demand capabilities model by an organization, said software code stored on a computer readable storage medium, said method comprising:
   receiving input data from an entity, said input data describing a current state, a target state, and a modelled state for the organization, said current state pertaining to current capabilities of the organization, said target state pertaining to capabilities that the organization wants to possess at an end of a specified period of time, said modelled state being a state of conformity by the organization to required characteristics;
   analyzing the received input data to determine parameters pertaining to the current state, the modelled state, and the target state; and
   displaying a graph that depicts said parameters, wherein the graph depicts said parameters for each business capability of a plurality of business capabilities, wherein the graph comprises a three-dimensional perspective view of an alignment of a business capability of the organization with respect to an information technology (IT) capability of the organization, and wherein the method further comprises:
      determining a first metric equal to a numerical value associated with a degree of change required for the organization to achieve the target state for the business capability in comparison with a degree of change required across the IT capability; and
      determining a second metric equal to a numerical value associated with a degree to which a business implementation of the on-demand capability lags that of the IT capability, wherein the graph comprises the first metric and the second metric.

6. A process, comprising: providing a consultancy service for determining the progress of adoption of an on-demand capabilities model by an organization, said providing the consultancy service comprising performing a method for determining the progress of adoption of an on-demand capabilities model by an organization, said method comprising:
  receiving input data from an entity, said input data describing a current state, a target state, and a modelled state for the organization, said current state pertaining to current capabilities of the organization, said target state pertaining to capabilities that the organization wants to possess at an end of a specified period of time, said modelled state being a state of conformity by the organization to required characteristics;
  a computer processor analyzing the received input data to determine parameters pertaining to the current state, the modelled state, and the target state; and
  displaying a graph that depicts said parameters, wherein the graph depicts said parameters for each business capability of a plurality of business capabilities, wherein the graph comprises a three-dimensional perspective view of an alignment of a business capability of the organization with respect to an information technology (IT) capability of the organization, and wherein the method further comprises:
    determining a first metric equal to a numerical value associated with a degree of change required for the organization to achieve the target state for the business capability in comparison with a degree of change required across the IT capability; and
    determining a second metric equal to a numerical value associated with a degree to which a business implementation of the on-demand capability lags that of the IT capability, wherein the graph comprises the first metric and the second metric.

7. The process of claim 6, wherein the plurality of business capabilities consist of services consisting of business services, application function services, development domain services, information domain services, user domain services, process domain services, information management domain services, and physical infrastructure services.

8. The process of claim 6, wherein the graph comprises an ideal path in which the business capability equals the IT capability and a projected path between the modelled state and the target state for the business capability.

9. The computer program product of claim 4, wherein the plurality of business capabilities consist of services consisting of business services, application function services, development domain services, information domain services, user domain services, process domain services, information management domain services, and physical infrastructure services.

10. The computer program product of claim 4, wherein the graph comprises an ideal path in which the business capability equals the IT capability and a projected path between the modelled state and the target state for the business capability.

11. The computer system of claim 5, wherein the plurality of business capabilities consist of services consisting of business services, application function services, development domain services, information domain services, user domain services, process domain services, information management domain services, and physical infrastructure services.

12. The computer system of claim 5, wherein the graph comprises an ideal path in which the business capability equals the IT capability and a projected path between the modelled state and the target state for the business capability.

\* \* \* \* \*